United States Patent
Camus et al.

(10) Patent No.: US 10,788,579 B2
(45) Date of Patent: Sep. 29, 2020

(54) METHOD OF OPTIMIZING PICTURE CAPTURES CARRIED OUT BY AN AIRBORNE RADAR IMAGING DEVICE, AND MISSION SYSTEM IMPLEMENTING SUCH A METHOD

(71) Applicant: THALES, Courbevoie (FR)

(72) Inventors: Fabien Camus, Pessac (FR); Fabien Richard, Pessac (FR); Gilles Guerrini, Pessac (FR); Vincent Corretja, Pessac (FR); Thierry Sfez, Pessac (FR); Richard Montigny, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/804,220

(22) Filed: Feb. 28, 2020

(65) Prior Publication Data

US 2020/0200895 A1     Jun. 25, 2020

Related U.S. Application Data

(62) Division of application No. 15/491,865, filed on Apr. 19, 2017, now Pat. No. 10,613,215.

(30) Foreign Application Priority Data

Apr. 22, 2016 (FR) .................... 16 00668

(51) Int. Cl.
*G01S 13/90* (2006.01)
*G08G 5/00* (2006.01)

(52) U.S. Cl.
CPC ............ *G01S 13/904* (2019.05); *G01S 13/90* (2013.01); *G08G 5/0034* (2013.01); *G01S 13/9064* (2019.05)

(58) Field of Classification Search
CPC .... G01S 13/90; G01S 13/904; G01S 13/9064; G01S 7/04; G08G 5/0034
See application file for complete search history.

(56) References Cited

U.S. PATENT DOCUMENTS 6,529,157 B1 * 3/2003 Mensa .................... G01S 7/412
                                                                342/173
7,589,662 B1   9/2009 Hulbert et al.
(Continued)

FOREIGN PATENT DOCUMENTS

FR       3 012 618 A1    5/2015

OTHER PUBLICATIONS

Nan Wang et al., "SAR sensor employment planning for tactical aircraft," The 2nd International Conference on Computer and Automation Engineering, Feb. 26, 2010, pp. 603-608, XP031671056.
Leavitt, "Real-Time In-Flight Planning," Institute of Electrical and Electronics Engineers, Proceedings of the IEEE 1996 National Aerospace and Electronics Conference, vol. 1, May 20, 1996, pp. 83-89, XP000868744.
(Continued)

*Primary Examiner* — Olumide Ajibade Akonai
(74) *Attorney, Agent, or Firm* — Baker & Hostetler LLP

(57) ABSTRACT

A radar imaging device having a mission to produce a radar image of a given target, comprising a step of determining the trajectory of the carrier of the imaging device comprises at least: a phase of determining a segment of trajectory for the picture capture, as a function of the position of the target and of the type of image to be produced, the picture capture segment being dedicated to the picture capture of the target by the imaging device; a phase of adding a segment of trajectory of stabilizing the carrier, situated upstream in the extension of the picture capture segment; a phase of addition of a segment of trajectory for homing the carrier onto the stabilizing segment.

4 Claims, 3 Drawing Sheets

(56) References Cited

U.S. PATENT DOCUMENTS

| | | | |
|---|---|---|---|
| 10,387,718 B2 | 8/2019 | Guerrini et al. | |
| 2002/0145555 A1* | 10/2002 | Klausing | G01S 7/411 342/25 R |
| 2002/0149599 A1 | 10/2002 | Dwyer et al. | |
| 2003/0052811 A1 | 3/2003 | Lawless | |
| 2003/0151540 A1 | 8/2003 | Faulkner | |
| 2007/0024489 A1* | 2/2007 | Cerwin | G01S 13/9027 342/22 |
| 2011/0298654 A1* | 12/2011 | Hellsten | G01S 13/9017 342/25 A |
| 2012/0033852 A1* | 2/2012 | Kennedy | G06K 9/00 382/103 |
| 2012/0218140 A1* | 8/2012 | Bergeron | G01S 13/904 342/25 A |
| 2013/0106649 A1* | 5/2013 | Brown | G01S 13/904 342/25 A |
| 2014/0282035 A1 | 9/2014 | Murthy et al. | |

OTHER PUBLICATIONS

G. N. Maroon et al., "Tactical Flight Management-Total Mission Capability," Proceedings/National Aerospace Electronics Conference; Proceedings of the IEEE 1984 National Aerospace and Electronics Conference, May 21, 1984, pp. 496-502, XP001614174.

D. Pastina et al., "Motion estimation and optimum time selection for ship ISAR imaging," Proceedings of the 2003 IEEE Radar Conference; May 5, 2003, pp. 7-14, XP010642632.

David M. Panton et al., "Mission Planning for Synthetic Aperture Radar Surveillance," Aug. 20, 1998, pp. 1-37, XP055321124. <http://miplib.zib.de/paper/pantonelbers1999_pp.ps.gz>.

C. H. Spenny et al., "Closely Supervised Control of a Target-Steered UAV," Proc. SPIE3840, Telemanipulator and Telepresence Technologies VI, Nov. 8, 1999, pp. 179, XP055321449.

* cited by examiner

METHOD OF OPTIMIZING PICTURE CAPTURES CARRIED OUT BY AN AIRBORNE RADAR IMAGING DEVICE, AND MISSION SYSTEM IMPLEMENTING SUCH A METHOD

CROSS-REFERENCE TO RELATED APPLICATIONS

This application is a divisional of U.S. patent application Ser. No. 15/491,865, filed Apr. 19, 2017, which is based on and claims priority from French Patent Application No. FR 1600668, filed Apr. 22, 2016, the entire contents of which are incorporated herein by reference.

FIELD OF THE INVENTION

The present invention relates to a method for optimizing picture captures carried out by an airborne radar imaging device. It also relates to a flight mission system implementing such a method.

BACKGROUND

Certain airborne radars comprise imaging modes making it possible to represent a zone or an object in a certain frequency band.

In particular, the SAR (Synthetic Aperture Radar) imaging mode makes it possible to carry out a picture capture of a ground zone or of a boat and the ISAR (Inverse Synthetic Aperture Radar) imaging mode allows picture capture of the superstructure of a ship.

In both these modes, the quality of the image obtained is highly dependent, inter alia, on the relative disposition of the carrier of the radar with respect to the target and on the speed of the target. For example, for optimal picture capture in SAR mode, the target must be situated in a certain direction with respect to the carrier during picture capture.

In a general manner, to get an SAR image the boat must not move (little or no swell) whilst in ISAR it must move (swell necessary).

In the absence of suitable assistance, compliance with these positioning constraints requires close attention on the part of the pilot of the carrier as well as solid experience in carrying out these operations.

At present, embedded mission systems provide the pilot at best with prompts based on the current position of the carrier and of the direction of the target. The pilot is therefore furnished with indications of the domain in which an image capture is possible.

This operative mode exhibits several drawbacks.

Firstly, it does not make it possible to anticipate the entire picture capture procedure. Secondly, it does not guarantee an optimal result in terms of image quality, given that these prompts can only be approximate.

Finally, this operative mode relies on the pilot's experience and attention.

Another drawback resides also in the fact that, the picture capture conditions varying, the images obtained cannot easily be used subsequently to feed an automatic target recognition system.

SUMMARY OF THE INVENTION

An aim of the invention is in particular to alleviate these drawbacks, by allowing optimal radar picture capture in SAR mode or in ISAR mode.

For this purpose, the subject of the invention is a method for optimizing picture captures carried out by an airborne radar imaging device, the mission of the said device being to produce a radar image of a given target, the said method comprising a step of determining the trajectory of the carrier of the said imaging device comprising at least:

a phase of determining a trajectory segment for the picture capture, as a function of the position of the said target and of the type of image to be produced, the said picture capture segment being dedicated to the picture capture of the said target by the said imaging device;

a phase of adding a trajectory segment for stabilizing the carrier, situated upstream in the extension of the said picture capture segment;

a phase of adding a trajectory segment for homing the carrier onto the said stabilizing segment.

The type of image to be produced being of SAR type, the said picture capture segment is defined at least by the following characteristics:

it is tangent to a circle centred on the said target;

its centre is situated on the line joining the said carrier to the said target;

it is wholly included in an annulus in which the picture capture by the said imaging device is possible.

The type of image to be produced being of the ISAR type, the said picture capture segment is for example defined at least by the following characteristics:

its centre is situated on one of the two straight lines oriented at substantially 15° with respect to the said speed vector;

it is wholly included in an annulus in which the picture capture by the said imaging device is possible.

The said method comprises for example a step, preceding the said trajectory determining step, in which the type of image to be produced is selected as a function of the context of the said mission. The said target being marine, the context is for example defined by the state of the sea.

The said method comprises for example a step following the said trajectory determining step in which the parameters defining the said trajectory are transmitted to the flight management system of the said carrier.

It comprises for example a step following the said trajectory determining step in which a picture capture activation order is transmitted to the said imaging device as a function of the state of advancement of the said carrier on the said trajectory.

The subject of the invention is also a flight mission system implementing such a method.

BRIEF DESCRIPTION OF THE DRAWINGS

Other characteristics and advantages of the invention will become apparent with the aid of the description which follows, given in relation to appended drawings which represent.

DETAILED DESCRIPTION

Figure 1:
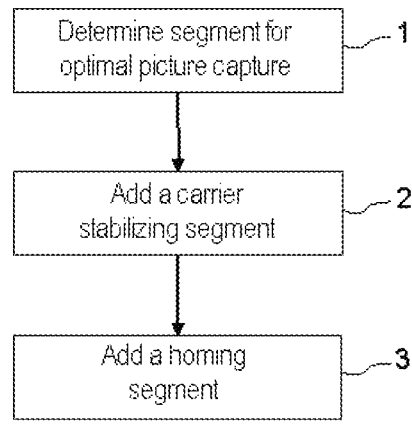
FIG. 1, the various flight trajectory calculation phases used by the method according to the invention.

FIG. 1 presents the various flight trajectory calculation phases used by the method according to the invention.

The method according to the invention leads to the obtaining of a trajectory making it possible to capture the best possible SAR or ISAR image, taking account of the relative attitudes and positions of the carrier of the radar and of the target.

A constant altitude is considered, corresponding to the cruising altitude of the vehicle for the given mission, in the operations zone.

The type of image to be produced is in particular determined as a function of the state of the sea. In a particular case of implementation of the method, if the sea is sufficiently calm in the sighted zone, the radar produces an SAR image. In the converse case, it produces an ISAR image.

Whichever imaging mode is employed, the flight plan is determined in three phases presented in FIG. 1.

In a first phase 1, the optimal picture capture trajectory segment is determined. The process for calculating this segment is described subsequently. This involves the flight plan segment during which the picture capture by the radar is performed. Its length is determined as a function of the duration of picture capture in the mode considered, increased by a margin, and of the speed of the carrier of the radar, in such a way that, if the picture capture is triggered on entry to this segment, the carrier does not exit it before the end of the picture capture.

In a second phase 2, a segment for stabilizing the carrier is added before the picture capture segment. This trajectory segment is situated in the extension of the picture capture segment, and upstream of the latter on the calculated flight plan. Its length is determined with the aid of the flight domain of the carrier, so that the latter can stabilize its flight before entry into the picture capture segment.

In a third phase 3, a homing segment for example is added before the stabilizing segment. This trajectory segment is calculated so as to take into account the constraints of survival and safety conditions applicable in the operations zone concerned. The calculation of this trajectory segment takes into account in particular an altitude margin with respect to the terrain, threats and "no-fly" zones, it being possible to take other parameters into account as a function of the operational context.

These three phases 1, 2, 3 are retrieved and calculated by a mission system which calculates the various segments.

Figure 2:
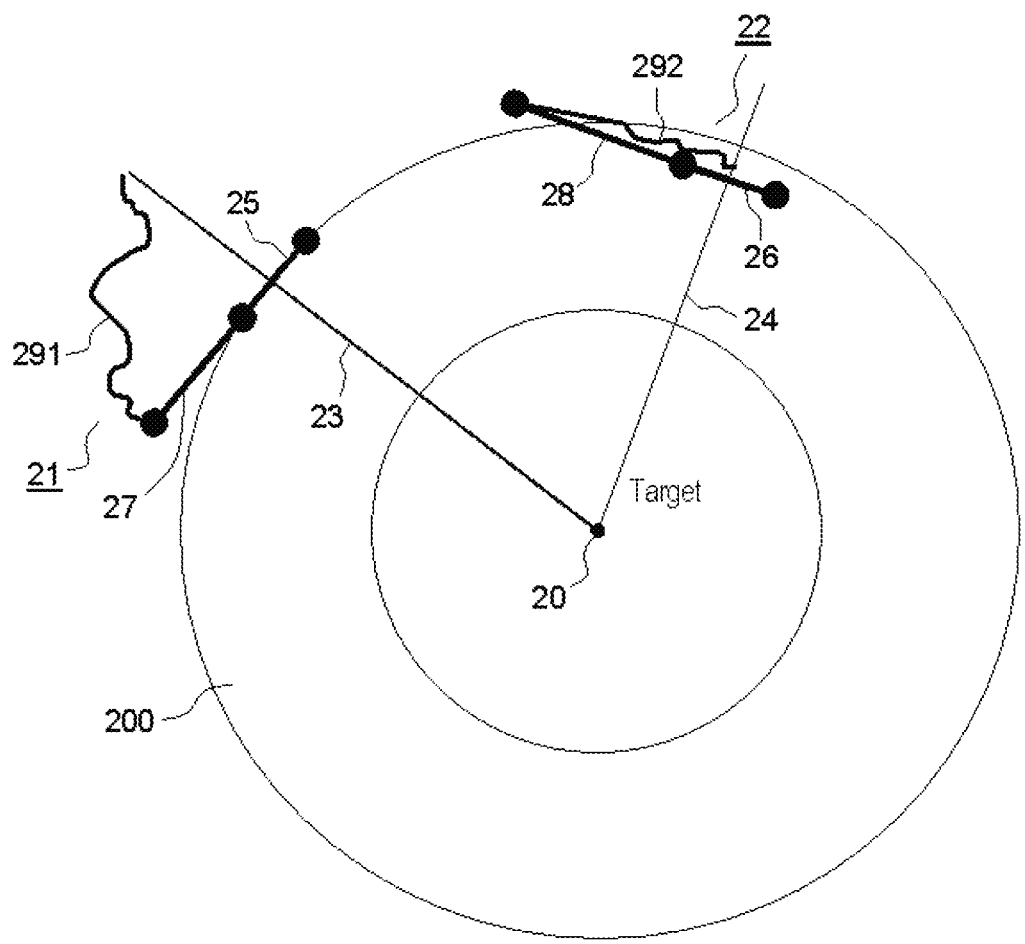
FIG. 2, examples of flight trajectories calculated according to the invention, to optimize the picture capture of the images of SAR type.
Figure 3:
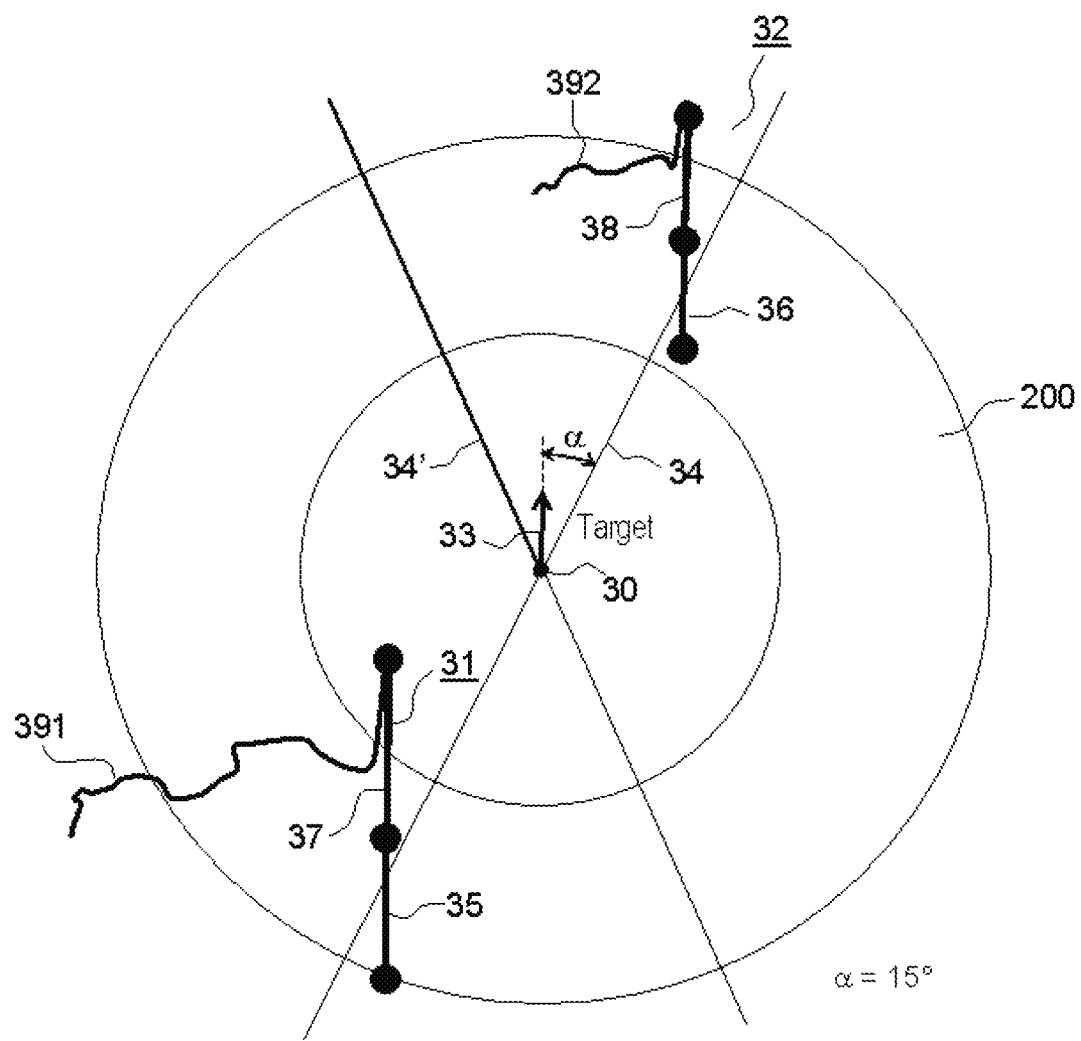
FIG. 3, examples of flight trajectories calculated according to the invention, to optimize the picture capture of the images of ISAR type.

Whichever imaging mode is used, the radar is characterized by minimum and maximum ranges which correspond to the minimum and maximum radii of an annulus centred on the target and in which the picture capture must be performed. FIGS. 2 and 3 illustrate these annuli, FIG. 2 corresponding to the SAR mode and FIG. 3 corresponding to the ISAR mode. These figures present by way of example two carriers of a radar imaging device.

FIG. 2 presents examples of calculating trajectories according to the invention for picture captures in SAR mode. A first trajectory 21 is associated with a first carrier. A second trajectory 22 is associated with a second carrier.

For optimal SAR picture capture, the antenna of the radar must be perpendicular to the straight line 23, 24 joining the carrier to the target 20, the antenna bearing having to be 90°. In phase 1 of determining the segment for optimal picture capture, this segment 25, 26 is therefore calculated in such a way that:
  it is tangent to a circle centred on the target 20;
  its centre is situated on the line 23, 24 joining the carrier to the target;
  it is wholly included in the annulus 200 in which picture capture is possible.

An additional condition is for example that it be as close as possible to the initial position of the carrier.

Once the segment for optimal picture capture 25, 26 has been calculated, the segment 27, 28 for stabilizing the carrier is added, in the extension of the picture capture segment. Next the homing segment 291, 292 is added, thus finalizing the generation of the flight plan allowing optimal radar picture capture.

FIG. 3 presents examples of calculating trajectories according to the invention for picture captures in ISAR mode. A first trajectory 31 is associated with a first carrier. A second trajectory 32 is associated with a second carrier.

For optimal ISAR picture capture, the antenna of the radar must be oriented in a direction making an angle of 15° with the speed vector of the target 30, the angle between the direction of pointing of the radar antenna and the speed vector 33 of the target having to be 15°. The segment for optimal picture capture 35, 36 is therefore calculated in such a way that:
  its centre is situated on one of the two straight lines 34, 34' oriented at 15° with respect to the heading of the target;
  it is wholly included in the annulus 200 in which picture capture is possible.

An additional condition is for example that it be as close as possible to the initial position of the carrier.

Once the segment for optimal picture capture 35, 36 has been calculated, the segment 37, 38 for stabilizing the carrier is added, in the extension of the picture capture segment. Next the homing segment 391, 392 is added, thus finalizing the generation of the flight plan allowing optimal radar picture capture.

As indicated previously, these trajectories are calculated by the mission system (or the radar itself if the following conditions are available). The calculations of the segments making up the trajectories 21, 22, 31, 32 are possible since the system is furnished with the necessary information:
  position and heading of the target to be imaged provided for example by an operator or determined in the objectives of the flight plan, this target being able to be a ground zone, a ship superstructure or a boat for example;
  position of the carrier;
  parameters defining the picture capture annulus 200;
  the context of the mission, for example the state of the sea in order to choose the SAR mode or the ISAR mode and calculate the trajectories accordingly.

When the optimal picture capture trajectory 21, 22, 31, 32 is calculated, the latter can be proposed to the pilot.

The precise tracking of a flight plan is a basic skill for a mission aircraft pilot and does not require any specific skills on the part of the pilot.

Advantageously, the invention is easily integrated into a, more global, automated mission system, this system affording the integration of all the constraints related to the mission objectives in a flight plan.

In the examples of FIGS. 2 and 3, the picture capture segment is rectilinear. According to the context and the type of sensor used, this segment might not be rectilinear. Likewise, the carrier stabilizing segment is rectilinear, but another configuration is possible, the essential thing being that it extends the picture capture segment upstream of the flight plan.

Figure 4:
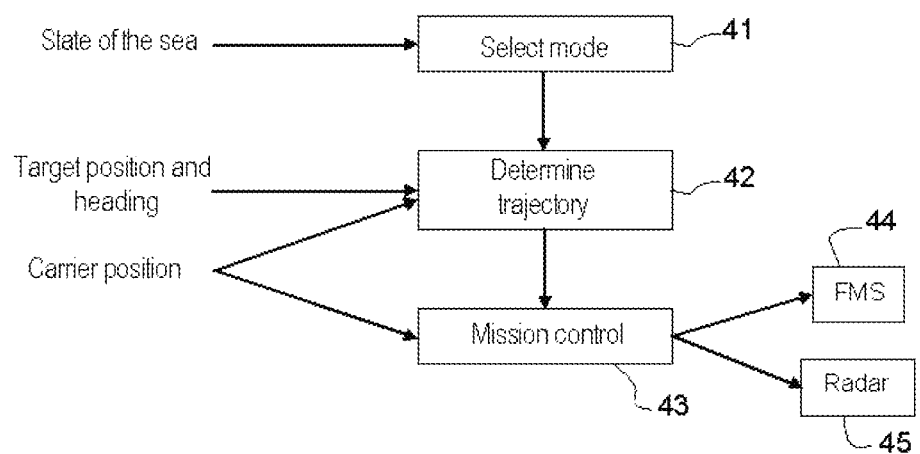
FIG. 4, the various possible steps for implementing the method according to the invention.

FIG. 4 illustrates the chronology of the processing performed by the mission system. The algorithm for calculating the flight plan depends on the image mode employed: SAR or ISAR, and on the performance of the sensor used.

The sequence of the processings is therefore defined by FIG. 4:

In a first step 41, the imaging mode is selected as a function of the context, for example of the state of the sea;

In a second step 42, the trajectory 21, 22, 31, 32 is determined as a function in particular of the position and of the heading of the target 20, 30 and of the position of the carrier, this trajectory being calculated according to the three phases 1, 2, 3 described previously;

In a third step 43, the control of the mission is performed on the basis of the flight plan calculated in the previous step 42, as a function of the position of the carrier with respect to the calculated trajectory. In an automated procedure, this control consists in particular in providing the calculated trajectory to the flight management system (FMS) and in activating the imaging function of the radar, that is to say the picture capture, as a function of the state of advancement of the carrier in the flight plan, and in particular of its position with respect to the calculated picture capture segment. More precisely, the parameters defining the trajectory are transmitted to the FMS of the carrier. Typically, picture capture is activated when the carrier enters this picture capture segment and deactivated when the carrier leaves it, it being possible to make provision for a margin to cover positioning errors. For this purpose, an activation order is dispatched to the imaging device.

It is possible, as a supplement to the previously described processings, to optimize the flight plan as a whole so as to reduce the overall length thereof or the fuel consumption of the carrier while complying with the flight domain of the carrier and the criteria presented hereinabove.

Advantageously, the flight plans calculated according to the method according to the invention make it possible to ensure that the picture captures take place under optimal conditions. The principle of automatic flight plan calculation making it possible to standardize picture captures facilitates in particular the subsequent utilization of the images.

The invention claimed is:

1. A method for optimizing picture captures carried out by an airborne radar imaging device, the mission of the device being to produce a radar image of the SAR type of a given target, said method comprising a step of determining the trajectory of the carrier of the imaging device, said step comprising at least:

a phase of determining a trajectory segment for the picture capture, as a function of the position of the target, the picture capture segment being dedicated to the picture capture of the target by the imaging device;

a phase of adding a trajectory segment for stabilizing the carrier, situated upstream in the extension of the picture capture segment;

a phase of adding a trajectory segment for homing the carrier onto the stabilizing segment;

the trajectory segment for the picture capture being defined at least by the following characteristics:

it is tangent to a circle centred on the target;

its centre is situated on the line joining the carrier to the target;

it is wholly included in an annulus in which the picture capture by the imaging device is possible.

2. The method according to claim 1, further comprising a step wherein the parameters defining the trajectory are transmitted to the flight management system of the carrier, said step following the trajectory determining step.

3. The method according to claim 1, further comprising a step wherein a picture capture activation order is transmitted to the imaging device as a function of the state of advancement of the carrier on the trajectory, said step following the trajectory determining step.

4. A flight mission system, wherein it is configured to implement the method according to claim 1.

* * * * *